Feb. 17, 1931.                G. M. PROUDFOOT                1,793,132
                                AIRCRAFT BODY
                            Filed Dec. 20, 1928         2 Sheets-Sheet 1
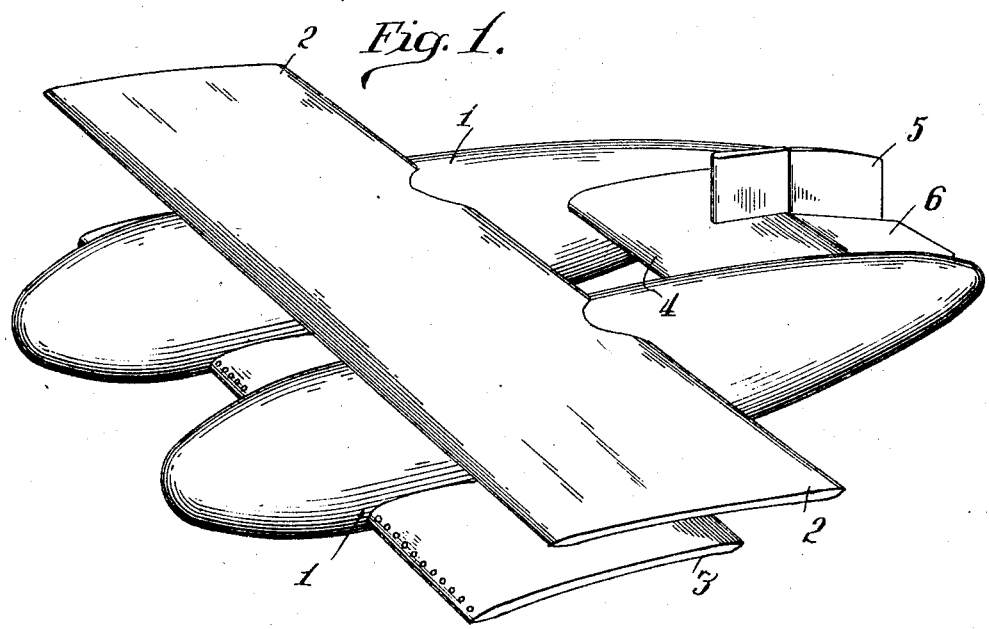
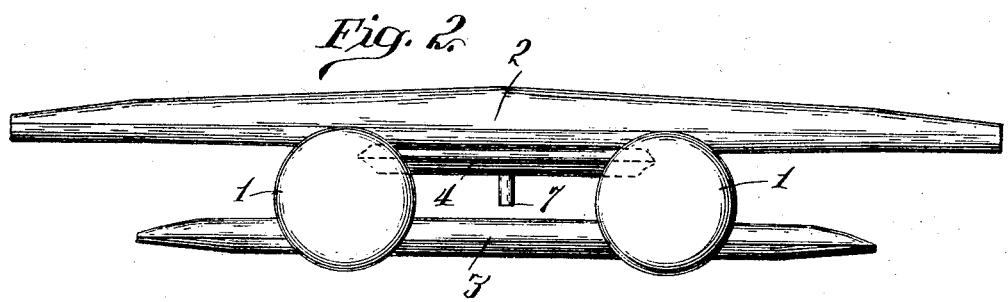
Inventor
Gordon M. Proudfoot
By Rudolph M. Fox
Attorney Feb. 17, 1931.  G. M. PROUDFOOT  1,793,132
AIRCRAFT BODY
Filed Dec. 20, 1928   2 Sheets-Sheet 2

Inventor
Gordon M. Proudfoot

Patented Feb. 17, 1931

1,793,132

UNITED STATES PATENT OFFICE

GORDON M. PROUDFOOT, OF CHICAGO, ILLINOIS

AIRCRAFT BODY

Application filed December 20, 1928. Serial No. 327,207.

This invention relates to improvements in the art of aerial navigation and more particularly in the hull or body structures of aircraft, the main object of the present invention being to produce a hull or body including wings or planes presenting a unitary structure combining features of both lighter than air and heavier than air craft so associated and relatively combined as to provide a craft which while operating on the principles of the heavier than air craft is of far less weight per square foot of effective wing or plane area than the last mentioned type of plane to thus render it capable of carrying proportionately greater loads per engine horse power than aircraft heretofore constructed.

Another object of the invention is to so construct an aircraft body as to include therein structural characteristics simulating those of a box-kite and, nautically, those of a catamaran, the craft of my invention being more particularly intended and adapted for landing on a body of water than on land and being particularly intended for trans-oceanic travel, has for its particular object to provide a structure which, in the event of a forced descent in midocean, will be capable of withstanding rough seas and of being navigated over the same to complete a trip or during such period as may be necessary to effect repairs.

I desire to make clear that my invention is concerned only with large aircraft having a minimum length of approximately two hundred feet and a wing-spread whose minimum is greater than the said length and is more efficient as the size is increased, my original drawings and specifications of the structure being directed to a craft six hundred thirty-five feet long and eight hundred feet wing-spread and equipped with accommodations for approximately one thousand persons comprising crew and passengers.

A further object of the invention is to provide a structure of the character defined which will permit of the use of a large number of propelling engines installed upon or within parts of the structure to be wholly or partially exposed or completely housed as to all except the propellers, the number of engines simultaneously operated determining the speed of travel while permitting reserve motive power for emergency uses exclusively.

In the accompanying drawings illustrating a suitable embodiment of the present invention:

Fig. 1 is a perspective view of an aircraft hull or body constructed in accordance with the invention.

Fig. 2 is a front elevation of the same.

Figure 3:
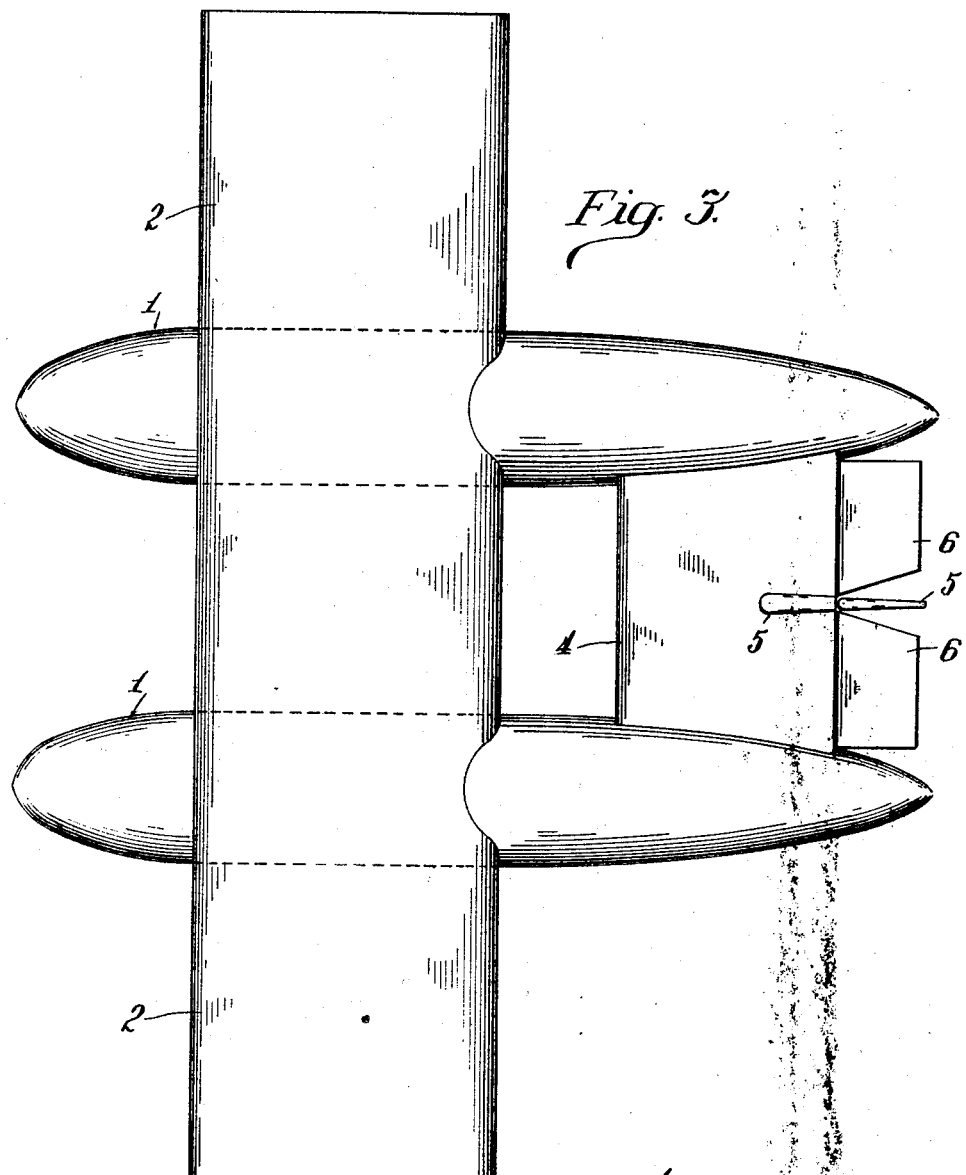
Figs. 3 and 4 are, respectively, a top plan view and a side elevation of the same.
Figure 4:
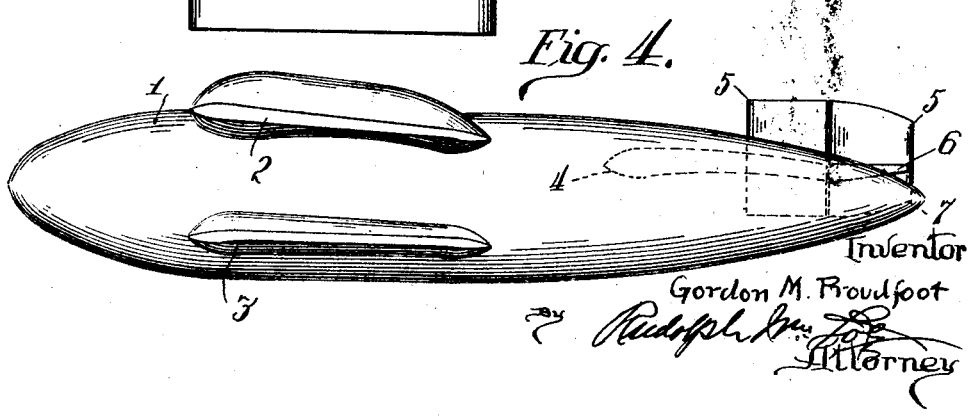

The structure of my invention consists primarily of a plurality of axially parallel hollow bodies 1 which, preferably are circular or substantially circular in cross-section at all points from end to end and are tapered at front and rear ends so as to be somewhat cigar-shaped. These hollow bodies 1 may, for purposes of this specification, be termed pontoons which, by reason of being spaced from each other a distance preferably greater than the maximum diameter of each thereof, will impart great stability to the craft when floating in water.

These bodies or pontoons 1 are rigidly associated with each other and with the wings or planes 2 and 3 and the transverse connecting member 4, all of which are hollow structures of large dimensions as compared with the wings or planes of the conventional air-craft and are shaped and constructed to provide air pressure surfaces of contour and area, respectively, adapted to promote flying efficiency, said elements 2, 3, and 4 being adapted to contain cabins and salons for the personnel and also provide a large volume of space adapted to receive a suitable lighter than air gas, the pontoons 1 being particularly designed and intended to receive such gas.

A further essential object of the invention resides in disposing the wings or planes 3 at a sufficient elevation above the lowest portions of the pontoons 1 to maintain the same out of reach of high waves, the gross weight of the whole craft being such that the displacement of water by the pontoons when afloat will be inappreciable or, in other words, not to exceed three to five per cent of the maximum diameter of said pontoons, the wings or planes 2 and 3 being disposed at the portions of maximum diameter of said pontoons.

As the present invention is concerned only with the hull and wing structure without regard to motive and control elements, no attempt will be made to describe the latter. Similarly the interior construction of the craft is neither illustrated or described herein but will be made the subject-matter of a separate application for Letters Patent.

It will be noted that the opposed side walls of the pontoons 1 between the front and rear edges of the portions of the elements 2 and 3 which bridge this space and which is bordered by the bottom wall of the bridge portion of the element 2 and top wall of the bridge portion of the element 3, constitutes the equivalent and imparts to the craft all of the known advantages of a box-kite, the element 4 constituting a fixed stabilizer or balancing element and also a suitable support for the control means such as the pivoted elements 5, 6, and 7 and may, obviously, contain machinery for operating the latter.

Obviously, the contour or cross-sectional shapes of the elements 2, 3, and 4 and particularly the contour and disposition of the lower faces thereof with respect to the plane of the axes of the pontoons 1 are important only in connection with the propelling means with which the same coact and are, therefore, not herein specifically described.

The pontoons 1 and elements 2, 3, and 4 are all metal shells, or in other words, have sheet metal walls.

Spacing apart of pontoons permits of lighter truss structure somewhat in reverse ratio to said spacing, it being obvious that the pontoons serve to impart rigidity to the bridge portions of the wings and the longer the latter are proportionately to their projecting end portions, the lighter will be the truss structure necessary to impart rigidity to said projecting end portions so that the spacing of the pontoons widely from each other imparts many advantages in that it increases the stability of the craft when afloat and also increases the cross-sectional area of the box-kite structure.

As the pontoons constitute the supports for the wings when afloat and the main lighter-than-gas containing elements, it is very essential that said pontoons shall be of large dimensions.

I claim as my invention:

1. An aircraft body comprising a plurality of axially parallel substantially cigar-shaped pontoons spaced from each other, a pair of wing elements arranged one above the other and spaced from each other bridging and rigidly associating said pontoons with each other at a point adjacent the forward ends thereof, the opposed faces of said wing elements coacting with the opposed faces of the pontoons to provide a substantially rectangular box-kite structure.

2. An aircraft body comprising a plurality of axially parallel substantially cigar-shaped pontoons spaced from each other, a pair of wing elements arranged one above the other and spaced from each other bridging and rigidly associating said pontoons with each other at a point adjacent the forward ends thereof, the opposed faces of said wing elements coacting with the opposed faces of the pontoons to provide a substantially rectangular box-kite structure, and a stabilizing plane-element bridging said pontoons adjacent their rear ends for further rigidly associating the same.

3. An aircraft body comprising a plurality of axially parallel substantially cigar-shaped pontoons spaced from each other, a pair of wing elements arranged one above the other and spaced from each other bridging and rigidly associating said pontoons with each other at a point adjacent the forward ends thereof, the opposed faces of said wing elements coacting with the opposed faces of the pontoons to provide a substantially rectangular box-kite structure, said wing members projecting beyond the outer sides of said pontoons.

4. An aircraft body comprising a plurality of axially parallel substantially cigar-shaped pontoons spaced from each other, a pair of wing elements arranged one above the other and spaced from each other bridging and rigidly associating said pontoons with each other at a point adjacent the forward ends thereof, the opposed faces of said wing elements coacting with the opposed faces of the pontoons to provide a substantially rectangular box-kite structure, and a stabilizing plane-element bridging said pontoons adjacent their rear ends for further rigidly associating the same, said wing members projecting beyond the outer sides of said pontoons.

5. An aircraft body comprising a plurality of axially parallel substantially cigar-shaped pontoons spaced from each other, a pair of wing elements arranged one above the other and spaced from each other bridging and rigidly associating said pontoons with each other at a point adjacent the forward ends thereof, the opposed faces of said wing elements coacting with the opposed faces of the pontoons to provide a substantially rectangular box-kite structure, the upper wing element projecting in part above the uppermost portions of said pontoons.

6. An aircraft body comprising a plurality of axially parallel substantially cigar-shaped pontoons spaced from each other, a pair of wing elements arranged one above the other and spaced from each other bridging and rigidly associating said pontoons with each other at a point adjacent the forward ends thereof, the opposed faces of said wing elements coacting with the opposed faces of the pontoons to provide a substantially rectangular box-kite structure, the upper wing element projecting in part above the uppermost portions of said pontoons and projecting beyond the outer sides of the latter.

7. An aircraft body comprising a plurality of axially parallel substantially cigar-shaped pontoons spaced from each other, a pair of wing elements arranged one above the other and spaced from each other bridging and rigidly associating said pontoons with each other at a point adjacent the forward ends thereof, the opposed faces of said wing elements coacting with the opposed faces of the pontoons to provide a substantially rectangular box-kite structure, the upper wing element projecting in part above the uppermost portions of said pontoons, and the lower wing element being disposed with its lower face appreciably above the lowest points in the pontoons.

8. An aircraft body comprising a plurality of axially parallel substantially cigar-shaped pontoons spaced from each other, a pair of wing elements arranged one above the other and spaced from each other bridging and rigidly associating said pontoons with each other at a point adjacent the forward ends thereof, the opposed faces of said wing elements coacting with the opposed faces of the pontoons to provide a substantially rectangular box-kite structure, the upper wing element projecting in part above the uppermost portions of said pontoons, and the lower wing element being disposed with its lower face appreciably above the lowest points in the pontoons, both said wing elements projecting laterally beyond the outer sides of the pontoons.

9. An aircraft body comprising a plurality of axially parallel substantially cigar-shaped pontoons spaced from each other, a pair of wing elements arranged one above the other and spaced from each other bridging and rigidly associating said pontoons with each other at a point adjacent the forward ends thereof, the opposed faces of said wing elements coacting with the opposed faces of the pontoons to provide a substantially rectangular box-kite structure, the upper wing element projecting in part above the uppermost portions of said pontoons, and the lower wing element being disposed with its lower face appreciably above the water line of said pontoons when afloat.

10. An aircraft body comprising a plurality of axially parallel substantially cigar-shaped pontoons spaced from each other, a pair of wing elements arranged one above the other and spaced from each other bridging and rigidly associating said pontoons with each other at a point adjacent the forward ends thereof, the opposed faces of said wing elements coacting with the opposed faces of the pontoons to provide a substantially rectangular box-kite structure, the upper wing element projecting in part above the uppermost portions of said pontoons, and the lower wing element being disposed with its lower face appreciably above the water line of said pontoons when afloat, and said stabilizing element disposed at an elevation above the lower and below the upper of said respective wing elements.

11. An aircraft structure comprising a pair of parallel substantially cigar-shaped pontoons, a pair of wing elements bridging and rigidly associating the same with each other, said wing elements ranged one above the other in spaced relation, the space between said pontoons being of greater width than the portion of greatest diameter of said pontoons and cooperating with the bridge portions of said wing elements to provide a box-kite structure.

12. An aircraft structure comprising a pair of parallel substantially cigar-shaped pontoons, a pair of wing elements bridging and rigidly associating the same with each other, said wing elements ranged one above the other in spaced relation, the space between said pontoons being of greater width than the portion of greatest diameter of said pontoons and cooperating with the bridge portions of said wing elements to provide a box-kite structure, and a stabilizing bridge-element disposed rearwardly of said box-kite structure and in the path of air currents passing through the latter.

13. An aircraft structure comprising a pair of parallel substantially cigar-shaped pontoons, a pair of wing elements projecting beyond the outer sides of said pontoons and at their middle portions bridging and rigidly associating said pontoons with each other, said wing elements ranged one above the other in spaced relation, the space between said pontoons being of greater width than the portion of greatest diameter of said pontoons and cooperating with the bridge portions of said wing elements to provide a box-kite structure.

14. An aircraft structure comprising a pair of parallel substantially cigar-shaped pontoons, a pair of wing elements projecting beyond the outer sides of said pontoons and at their middle portions bridging and rigidly associating said pontoons with each other, said wing elements ranged one above the other in spaced relation, the space between said pontoons being of greater width than the portion of greatest diameter of said pontoons and cooperating with the bridge portions of said wing elements to provide a box-kite structure, and a stabilizing bridge-element disposed rearwardly of said box-kite structure and in the path of air currents passing through the latter.

GORDON M. PROUDFOOT.